(12) United States Patent
Li et al.

(10) Patent No.: US 12,723,705 B1
(45) Date of Patent: Sep. 1, 2026

(54) ONE TRIGGER ACTIVATION RETRACTION OR EXTENSION OF A PHOTOGRAPHIC EQUIPMENT

(71) Applicant: Guangdong Sirui Optical Co., Ltd., Zhongshan (CN)

(72) Inventors: Jie Li, Zhongshan (CN); Zhiwu He, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

(21) Appl. No.: 19/558,103

(22) Filed: Mar. 5, 2026

(30) Foreign Application Priority Data

Feb. 9, 2026 (CN) ......................... 202610195323.3
Feb. 9, 2026 (CN) ......................... 202620202884.7

(51) Int. Cl.
*F16M 11/32* (2006.01)
*G03B 17/56* (2021.01)

(52) U.S. Cl.
CPC ....... *F16M 11/32* (2013.01); *F16M 2200/027* (2013.01); *G03B 17/561* (2013.01)

(58) Field of Classification Search
CPC . F16M 11/32; F16M 2200/027; G03B 17/561
See application file for complete search history.

(56) References Cited

U.S. PATENT DOCUMENTS 6,286,795 B1 * 9/2001 Johnson ................. F16M 11/16 248/188
12,449,089 B2 * 10/2025 Zhu ........................ F16M 11/32
2010/0282921 A1 * 11/2010 Hein .................... G03B 17/561 248/125.8
2022/0291574 A1 * 9/2022 Speggiorin ........... F16B 7/1454

* cited by examiner

*Primary Examiner* — Anita M King
(74) *Attorney, Agent, or Firm* — Loeb & Loeb LLP

(57) ABSTRACT

A one-touch operation support frame comprises an installation platform, multiple support legs, and an operating handle. Each support leg includes: a leg head end seat; a multi-section leg tube with axial telescoping capability from outer to inner; a leg tube locking assembly for securing or releasing the multi-section leg tube; a transmission shaft assembly rotatably mounted around its axis; and a gear transmission assembly installed on the leg head end seat. The transmission shaft assembly connects the power output end of the gear transmission assembly to the leg tube locking assembly. The operating handle is connected to multiple traction lines, each linked to the power input end of the gear transmission assembly on different support legs. The operating handle simultaneously applies traction force to all three traction lines, enabling simultaneous locking/unlocking of all three support legs.

20 Claims, 10 Drawing Sheets

420
410
268
262
263
211
269
267
266
211A
264
265
2652
2653
2651

360

350
320
370

ONE TRIGGER ACTIVATION RETRACTION OR EXTENSION OF A PHOTOGRAPHIC EQUIPMENT

CROSS-REFERENCE TO RELATED APPLICATIONS

This application claims the priority of Chinese applications 202610195323.3 and 202620202884.7, filed on Feb. 9, 2026, whose disclosures are incorporated by reference in their entirety herein.

TECHNICAL FIELD

Aspects of the invention generally relate to the technical field of photographic auxiliary equipment, specifically to a one-button-operated tripod.

BACKGROUND

A professional tripod for photography primarily comprises a mounting platform and three supporting legs connected to it. The platform is designed to mount cameras and other equipment. Each leg assembly features multiple telescopic tubes, with locking mechanisms between adjacent tubes. Each locking mechanism has an independent switch. To fully extend all tubes, both sets of switches must be activated. To deploy the entire tripod, six switches need to be opened, making it highly inconvenient to use.

To simplify the cumbersome locking/unlocking process of traditional support scaffolds, existing approach uses a control handle integrated into the installation platform. Users may activate the locking/unlocking function for the three support leg assemblies with a single button press. When locked, all legs remain fixed in position; when unlocked, users may extend or retract the legs to adjust the support height as needed.

However, in these one-touch locking support stands, the control handle is a hydraulic actuator housing a hydraulic cylinder. The support leg assembly comprises a piston cylinder and piston rod, with the locking mechanism between adjacent support leg tubes fixedly connected to the piston rod. The hydraulic cylinder supplies hydraulic oil to the piston cylinders within the three support leg assemblies via multiple oil pipes. The piston rod drives the locking mechanism to achieve interlocking or un-interlocking between adjacent support leg tubes.

However, in the hydraulic drive locking support frame, the hydraulic oil flow in the oil pipe takes a certain time, so the adjacent two legs cannot achieve instant locking, resulting a locking delay. Such phenomenon is undesirable and improvement is welcome.

SUMMARY

Embodiments of the invention therefore aim to overcome the technical problem of the conventional hydraulic-driven support leg locking mechanism in the support frame, which cannot achieve instantaneous locking and compromises user experience, thereby providing a one-touch operation support frame.

To address the aforementioned technical challenges, embodiments of the invention propose the following technical solution:

A one-touch operation support stand, comprising an installation platform, at least three support legs connected to one end of the platform, and an operating handle attached to the platform; each support leg includes:

The leg head end seat is connected to the installation platform at one end.

The leg tube assembly comprises multiple axially telescopic leg tubes arranged sequentially from the outermost to the innermost, with the outermost tube's end fixedly connected to the leg head end seat.

The leg tube locking assembly, housed within the support leg, enables multi-section locking or unlocking of the leg tube.

The drive shaft assembly, mounted on the support leg and rotatable about its own axis, is connected to the leg tube locking assembly for transmission.

The gear transmission assembly is mounted on the leg head end seat, with its power output end connected to the transmission shaft assembly for power transmission.

The traction line, connected to the power input end of the gear transmission assembly, drives the leg tube locking assembly to either lock or unlock positions through the gear transmission assembly and the drive shaft assembly.

At least three traction lines extend from the leg head end seat and connect to the operating handle, which is used to simultaneously apply traction force to these lines.

Furthermore, the gear transmission assembly is installed inside the leg head end seat, which includes:

The rotating shaft, connected to the leg head end seat, is rotatably mounted about its own axis.

The arm is fixedly connected to the rotating shaft at one end and to the traction line at the other end.

The first gear, fixedly mounted on the rotating shaft, rotates synchronously with the swing arm.

The second gear is connected to the head end seat of the support leg and fixedly connected coaxially with the transmission shaft assembly; the second gear is transmissionally connected to the first gear.

When the traction line is pulled, it drives the swing arm, the rotating shaft, and the first gear to rotate axially around the rotating shaft. The first gear then drives the second gear and the transmission shaft assembly to rotate axially around its own axis.

Furthermore, the gear transmission assembly further comprises a right-angle double-sided rack connected between the first and second gears. This rack comprises two perpendicular tooth surfaces: a first rack meshing with the first gear and a second rack engaging with the second gear.

Furthermore, the pitch of the first rack is greater than that of the second rack.

Furthermore, the base of the leg head seat comprises a linear guide slot whose orientation is parallel to the length direction of the first rack. The right-angle double-sided rack comprises a rack slider slidably connected to the linear guide slot along its orientation.

Furthermore, a reset spring is installed in the linear sliding groove. When the swing arm is rotated by the traction line, the reset spring is compressed by the rack slider and accumulates elastic potential energy.

Furthermore, the linear sliding groove comprises a guide rod fixed to the leg head end seat. The guide rod's axial direction is parallel to the first rack's lengthwise direction, with the rack slider mounted on its outer circumference and slidably connected to the guide rod.

Furthermore, the inner wall of the leg head end seat is fixedly connected to a side mounting seat, with one end of the rotating shaft attached to this seat. The side mounting seat features an arc-shaped limiting groove whose centerline coincides with the rotating shaft's axis. The swing arm's connection end to the traction line is fixed with a guide shaft, whose axis is parallel to the rotating shaft's axis, and one end of which extends into the arc-shaped limiting groove.

Furthermore, the gear transmission assembly includes a torsion spring encircling the rotating shaft's outer periphery. Positioned between the swing arm and the side mounting bracket, the spring connects to both components. When the swing arm rotates under the pull line's force, the torsion spring twists and stores elastic potential energy.

Furthermore, the mounting platform is equipped with a centrally positioned connector for camera equipment installation. Its interior features a circumferential cavity surrounding the connector, which houses multiple protective sleeves. These sleeves extend from the platform to the operating handle at one end, while their opposite ends connect to the leg head end seats. Multiple traction lines are routed through the internal channels of these protective sleeves.

Furthermore, the leg tube assembly comprises a front leg tube, a middle leg tube, and a rear leg tube arranged sequentially from the exterior to the interior and capable of axial extension, wherein the front, middle, and rear leg tubes are circumferentially fixed relative to each other.

The leg tube locking assembly comprises a first locking assembly installed between the front and middle leg tubes, and a second locking assembly installed between the middle and rear leg tubes.

The drive shaft assembly comprises an inner drive shaft fixed to the power output end of the gear transmission assembly, and an outer drive shaft sleeved around the inner shaft with circumferential fixation and axial sliding. The outer shaft is operatively connected to a first locking mechanism to prevent the middle leg tube from moving relative to the front leg tube, and to a second locking mechanism to prevent the rear leg tube from moving relative to the middle leg tube.

Furthermore, the first locking assembly comprises:

The first fixing sleeve is fixedly connected to the middle leg tube, with one end extending into the front leg tube. Its outer wall features a first inclined conical surface.

The first rotating sleeve is coaxially arranged with the first fixed sleeve, maintaining relative axial fixation and circumferential rotation. It is sleeved around the outer circumference of the outer drive shaft and fixed circumferentially to it.

The first sliding sleeve is positioned inside the front leg tube and partially encases the outer circumference of the first fixed sleeve, while being threadedly connected to the outer circumference of the first rotating sleeve.

When the external drive shaft rotates the first rotating sleeve circumferentially, one end of the first sliding sleeve either slides into the gap between the first fixed sleeve and the front leg tube, pressing against the first inclined conical surface of the first fixed sleeve to lock the front and middle leg tubes, or slides out of the gap, releasing the pressure to unlock the front and middle leg tubes.

Furthermore, the first sliding sleeve comprises a first ball bearing, with part of the ball protruding from its inner wall to abut against the first inclined conical surface.

Furthermore, the first inclined conical surface comprises a primary first inclined conical surface and a secondary first inclined conical surface arranged sequentially along the axial direction of the first fixed sleeve. Two first balls are provided, each contacting the respective primary and secondary first inclined conical surfaces.

Furthermore, the first locking assembly includes a first limiting sleeve fixedly mounted on the outer periphery of the first rotating sleeve and positioned inside the front leg tube. This sleeve is located at the end of the first sliding sleeve adjacent to the support leg head end seat, with a first elastic member disposed between the limiting sleeve and sliding sleeve.

Furthermore, the second locking assembly has the same structure as the first locking assembly.

Furthermore, the operating handle comprises an operating section attached to the mounting platform and a moving section driven by the operating section, with at least three traction lines extending from the leg head end seat and all connected to the moving section.

Furthermore, the operation section includes:

The handle shaft, with one end attached to the mounting platform, comprises an internal movable cavity and comprises a radial through-sliding groove extending along its axial direction.

The handle rotation sleeve is mounted around the handle shaft, maintaining axial fixation relative to the shaft while allowing circumferential rotation.

The motion part includes:

The handle sliding sleeve is slidably mounted along the axial direction of the handle shaft, encircling its outer circumference, and threadedly engaged with the inner wall of the handle rotating sleeve.

The fixed pin is securely attached to the handle sliding sleeve and slidably connected along the handle shaft's axial direction within the through sliding groove. Multiple traction lines are fixedly connected to the fixed pin via the handle shaft's inner cavity.

Furthermore, the fixing pin comprises multiple threading holes for the traction line to pass through, and the traction line is connected to a traction line limiting head whose outer diameter is larger than the threading holes and abuts against the fixing pin for positioning.

Furthermore, the outer wall of the handle shaft comprises an outwardly protruding limit rib, which extends axially along the handle shaft. The inner wall of the handle sliding sleeve comprises a limit groove that slidably engages with the limit rib.

Furthermore, the mounting platform's outer periphery is fixedly connected to a handle hinge head. The operating handle comprises a handle connection seat fixedly attached to the handle shaft near the hinge head's proximal end. This connection seat is pivotally mounted to the hinge head via a hinge shaft, which incorporates a handle locking knob for securing both the connection seat and the hinge head.

The one-touch operation support frame disclosed in embodiments of the invention offers the following advantages: One end of the traction line connects to the gear transmission assembly of the support legs, enabling the leg tube locking assembly to tighten or loosen multiple leg tubes through the gear transmission and drive shaft assembly when the traction line is pulled. Meanwhile, the other ends of the traction lines connected to at least three support legs are all linked to the operating handle. When the handle is operated, it may simultaneously apply traction force to at least three traction lines, allowing simultaneous tightening or loosening of multiple support legs. This enables one-touch release and fixation of multiple support legs, simplifying operation and significantly improving the adjustment speed of the support legs. Compared to existing one-touch operation frames with electrically controlled handles, this design eliminates the need for charging or additional equipment like chargers or power banks, enhancing portability. Unlike hydraulic-driven handle models, it achieves instant locking without any delay. The gear transmission assembly features a larger tooth pitch on the first rack compared to the second, increasing the transmission ratio. Under constant locking force conditions, the operating handle requires relatively less force to unlock, achieving energy-saving effects. When the handle rotates to the unlocked position, the torsion spring and reset spring are released, instantly driving the drive shaft assembly to rotate and immediately activating the leg tube locking assembly to secure multiple leg tubes, eliminating noticeable locking delays.

BRIEF DESCRIPTION OF THE DRAWINGS

To better illustrate the specific embodiments of the invention or the technical solutions in prior art, the accompanying drawings used in the description will be briefly introduced below. It is evident that these drawings represent certain embodiments of the invention. For those skilled in the art, additional drawings may be derived from these without requiring inventive effort.

Figure 1:
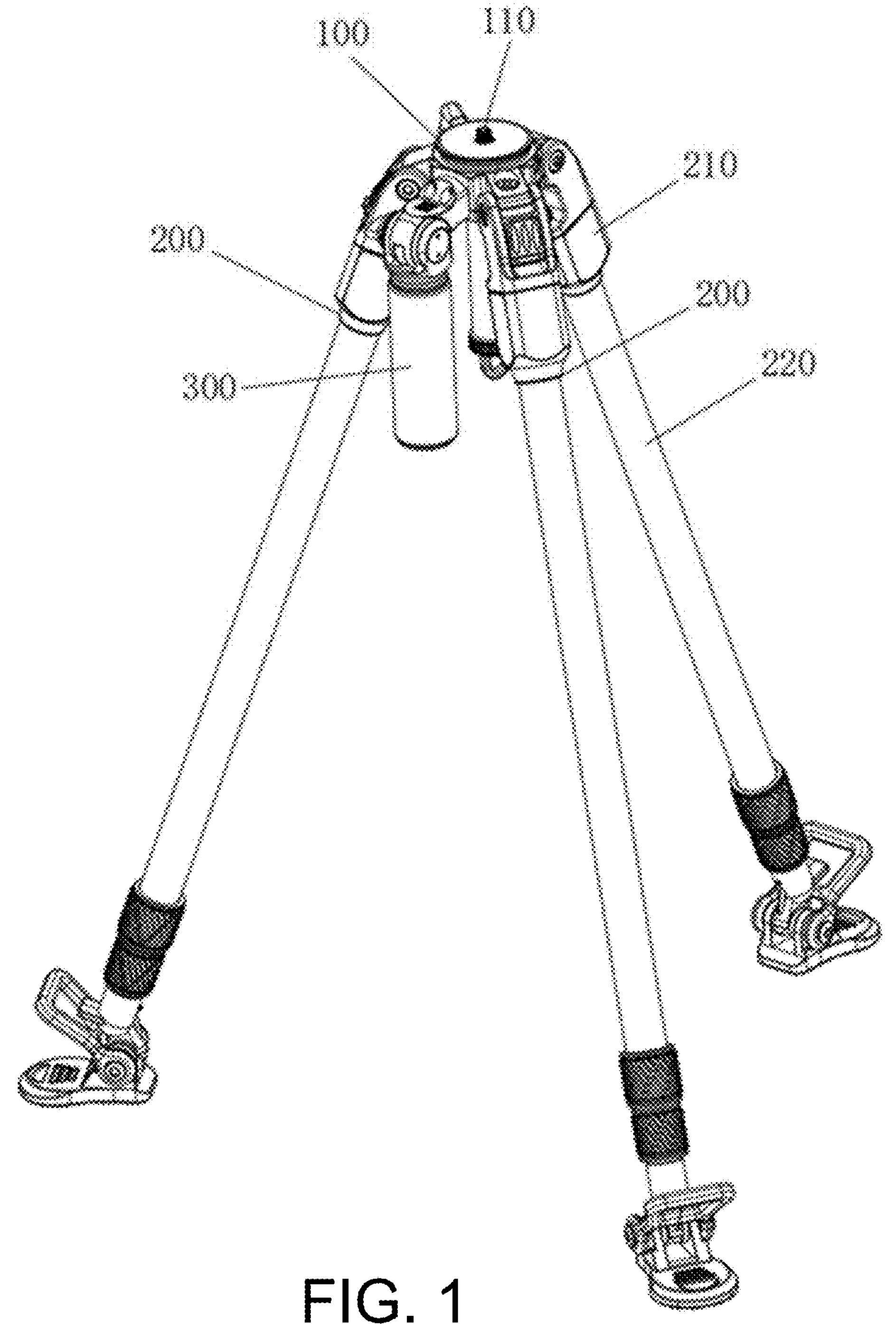
FIG. 1 shows a three-dimensional structural diagram of the one-button operation support stand in the embodiments of the present invention.

Reference characters used in the drawings: 100, installation platform; 101, annular cavity; 110, connector; 120, leg connection base; 200, support leg; 210, leg head end base; 211, side mounting base; 211A, arc-shaped limiting groove; 212, linear sliding groove; 213, bearing; 220, leg tube assembly; 221, front leg tube; 222, middle leg tube; 223, rear leg tube; 231, first fixing sleeve; 231A, first inclined conical surface; 231B, second inclined conical surface; 232, first rotating sleeve; 233, first sliding sleeve; 234, first ball; 235, first limiting sleeve; 236, first elastic member; 241, second fixing sleeve; 241A, first inclined conical surface; 241B, second inclined conical surface; 242, second rotating sleeve; 243, second sliding sleeve; 244, second ball; 245, second limiting sleeve; 246, second elastic member; 251, inner drive shaft; 252, outer drive shaft; 261, rotating shaft; 262, swing arm; 263, first gear; 264, second gear; 265, right-angle double-sided rack; 2651, first rack; 2652, second rack; 2653, rack slider; 266, reset spring; 267, guide rod; 268, guide shaft; 269, torsion spring; 300, operating handle; 310, handle shaft; 311, movable cavity; 312, through sliding groove; 313, limiting rib; 320, handle rotating sleeve; 330, handle sliding sleeve; 340, fixed pin; 350. Handle hinge joint; 360. Handle connection base; 370. Handle locking knob; 410. Traction cable; 420. Protective sleeve.

DETAILED DESCRIPTION

The technical solution of embodiments of the invention will be described in detail with reference to the accompanying drawings. It should be noted that the embodiments described herein constitute only a subset of the invention's possible implementations, not its entirety. Any additional embodiments developed by skilled practitioners in the field without inventive effort are hereby incorporated into the scope of protection of embodiments of the invention.

In the description of embodiments of the invention, it should be noted that the terms "center," "up," "down," "left," "right," "vertical," "horizontal," "inside," and "outside" refer to the orientations or positional relationships shown in the accompanying drawings. These terms are used solely to facilitate the description of the invention and simplify the explanation, without implying that the devices or components must be positioned or constructed in specific ways. Therefore, they should not be construed as limiting the invention. Additionally, the terms "first," "second," and "third" are used for descriptive purposes only and do not indicate or imply any relative importance.

In the description of embodiments of the invention, it should be noted that unless otherwise expressly provided or limited, the terms "installation", "connected", and "connection" shall be interpreted broadly. These may include but are not limited to: fixed connections, detachable connections, or integral connections; mechanical connections, electrical connections; direct connections, indirect connections via intermediate media, or internal communication between two components. Those skilled in the art will understand the specific meanings of these terms in the context of embodiments of the invention.

The one-touch operation support stand shown in FIG. 1 comprises an installation platform, three support legs hinged at one end to the platform, and an operating handle attached to the platform. The platform's center features a mounting head for photographic equipment, while the three support legs are evenly spaced around its perimeter. The handle, also mounted on the platform's outer edge, allows manual operation. Note that the number of support legs is not limited to three and may exceed this quantity.

Figures 2, 3:
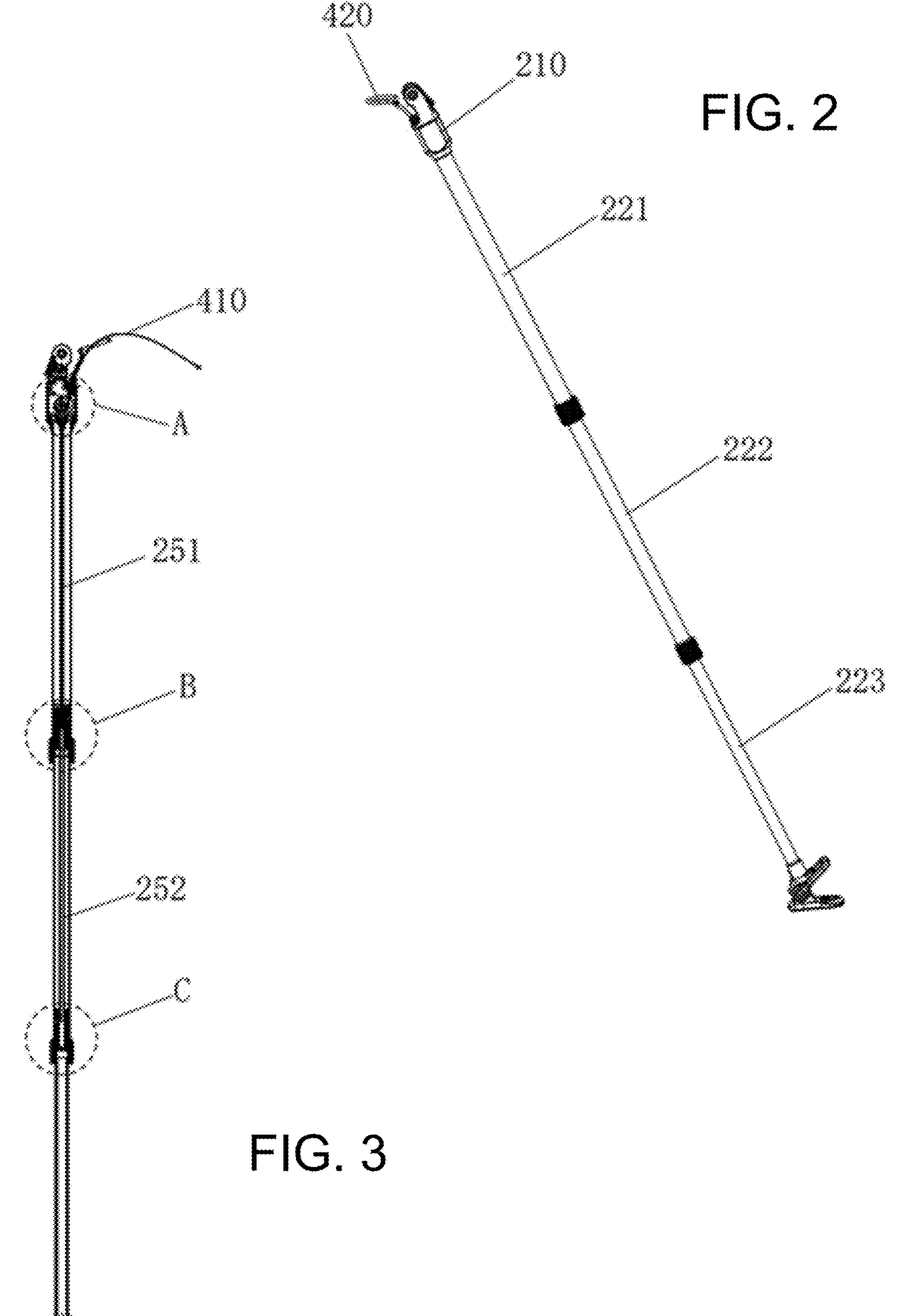
FIG. 2 shows a three-dimensional structural diagram of the support leg in the embodiments of the present invention.
FIG. 3 shows a cross-sectional view of the support leg in the embodiment of the present invention.

As shown in FIGS. 1 and 2, the support leg 200 comprises a leg head end seat 210 and a leg tube assembly 220. The leg head end seat 210 is hinged to the mounting platform 100 at one end. The leg tube assembly 220 comprises three axially extendable segments arranged from outer to inner: the front leg tube 221, middle leg tube 222, and rear leg tube 223. The front and middle leg tubes are circumferentially fixed while maintaining axial sliding, with the rear leg tube also configured similarly. The front leg tube 221 is fixed to the leg head end seat 210. The specific configuration of these three legs—maintaining circumferential fixation with axial sliding—is conventional and not the core innovation of this application, hence omitted here. It should be noted that the leg tube assembly 220 may comprise two, four, or more tubes than the three specified.

Figure 4:
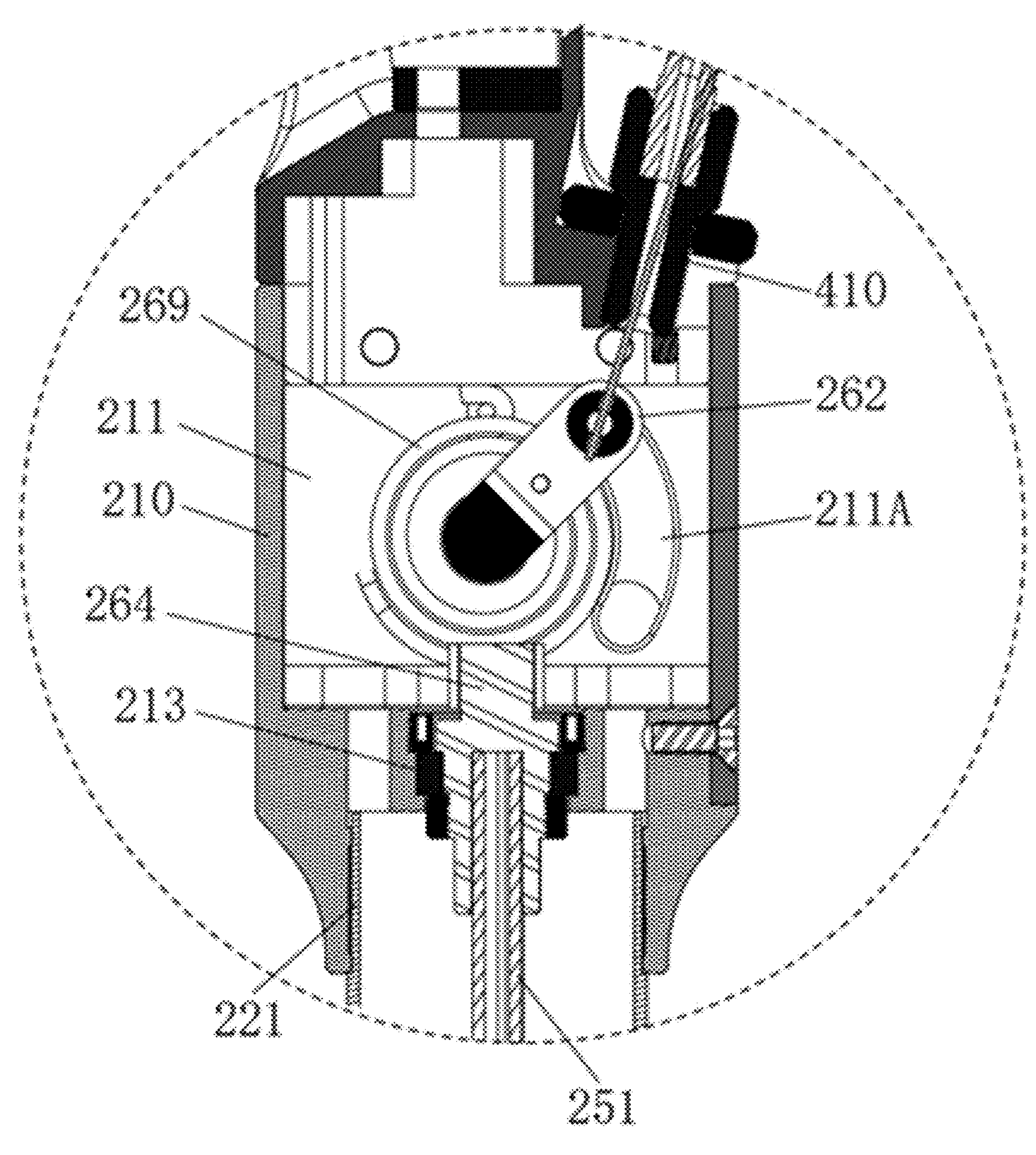
FIG. 4 is an enlarged view of the area labeled A in FIG. 3.

As shown in FIGS. 2, 3, and 4, the support leg 200 further comprises a leg tube locking assembly and a drive shaft assembly located within the support leg 200. The leg tube locking assembly is designed to lock or unlock the front leg tube 221, middle leg tube 222, and rear leg tube 223. The drive shaft assembly, rotatably mounted around its own axis within the support leg 200, is transmissionally connected to the leg tube locking assembly. Specifically, the leg tube locking assembly includes a first locking component for interlocking the front leg tube 221 and middle leg tube 222, and a second locking component for interlocking the middle leg tube 222 and rear leg tube 223. The drive shaft assembly comprises an inner drive shaft 251 and an outer drive shaft 252 arranged coaxially and capable of axial extension. One end of the inner drive shaft 251 is fixedly connected to the interior of the leg head end seat 210 and rotatably mounted around its own axis, with one end extending into the interior of the front leg tube 221. The outer drive shaft 252 is sleeved around the outer periphery of the inner drive shaft 251 and remains circumferentially fixed relative to it. When the inner drive shaft 251 rotates, the outer drive shaft 252 rotates synchronously with it. The outer drive shaft 252 is operatively connected to the first locking component to releasably prevent movement of the middle leg tube 222 relative to the front leg tube 221, and is also operatively connected to the second locking component to releasably prevent movement of the rear leg tube 223 relative to the middle leg tube 222.

Figure 5:
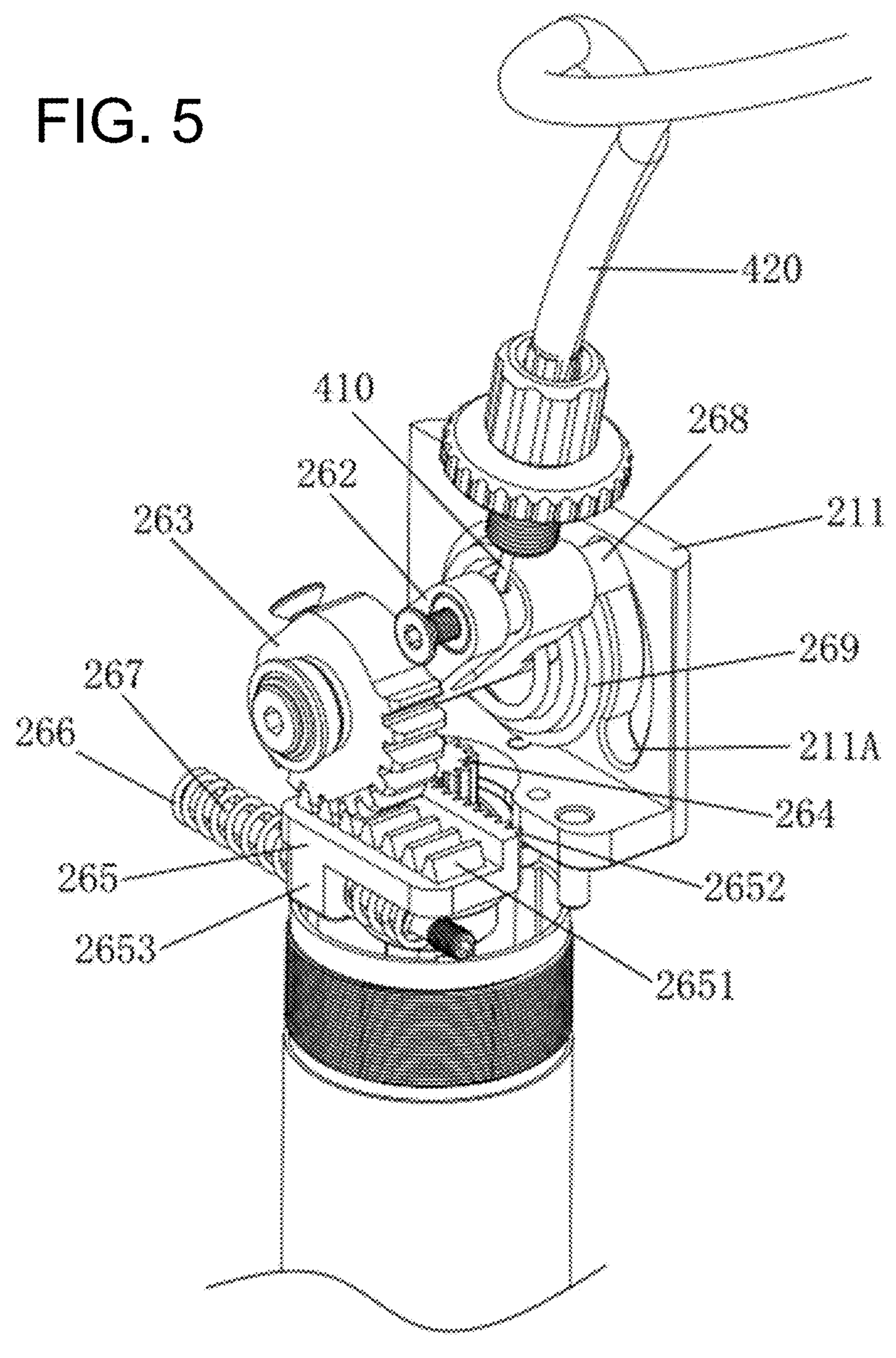
FIG. 5 shows a three-dimensional structural diagram of the gear transmission assembly in the embodiments of the present invention.

As shown in FIGS. 3, 4, and 5, the support leg 200 also includes a gear transmission assembly housed within the leg head end seat 210. This assembly comprises a power input end and a power output end, with the latter fixedly connected to one end of the inner transmission shaft 251. The power input end is linked to the traction line 410, whose other end connects to the operating handle 300. Three traction lines 410 attached to the support legs 200 extend beyond the leg head end seat 210 and all connect to the operating handle 300, enabling simultaneous traction force application. When the operating handle 300 is operated to apply traction force to the traction lines 410, these lines drive the power input end of the gear transmission assembly, thereby causing the power output end to rotate both the inner transmission shaft 251 and the outer transmission shaft 252 around their respective axes. When both the first and second locking assemblies are engaged, the traction line 410 drives the outer transmission shaft 252 to rotate axially. This rotation simultaneously unlocks the assemblies, releasing the front leg tube 221, middle leg tube 222, and rear leg tube 223, allowing adjustment of the support leg 200's telescopic length through sliding multiple leg tubes. Upon reaching the desired length, the control handle 300 reverses direction, resetting the traction line 410 and rotating the outer transmission shaft 252 toward the locking position. This rotation then re-engages both assemblies. The system enables rapid, one-time locking/unlocking of multiple leg tube assemblies in the support leg 200, ensuring user-friendly operation.

As shown in FIGS. 3, 4, and 5, the gear transmission assembly is entirely housed within the leg head end seat 210. This assembly comprises a rotating shaft 261, a swing arm 262, a first gear 263, a second gear 264, a reset spring 266, a guide rod 267, a guide shaft 268, and a torsion spring 269. The inner wall of the leg head end seat 210 is fixedly connected to a side mounting seat 211, with the rotating shaft 261 mounted between these two components and configured to rotate axially. One end of the swing arm 262 is fixed to the rotating shaft 261, while its opposite end features a line hole for securing the traction cable 410. The first gear 263 is fixedly mounted on the rotating shaft 261 and rotates synchronously with the swing arm 262. The second gear 264, coaxially fixed to the leg head end seat 210, engages with the first gear 263 through meshing. An inner transmission shaft 251 is rotatably connected to the base of the leg head end seat 210 via a bearing 213, with the second gear 264 fixedly attached to it. It should be noted that the first gear 263 and second gear 264 may either directly mesh or indirectly engage through an intermediate gear component. When the traction line 410 is pulled, it drives the swing arm 262, the rotating shaft 261, and the first gear 263 to rotate axially around the rotating shaft 261. The first gear 263 then drives the second gear 264 and the internal transmission shaft 251 to rotate axially around their respective axes.

Figure 6:
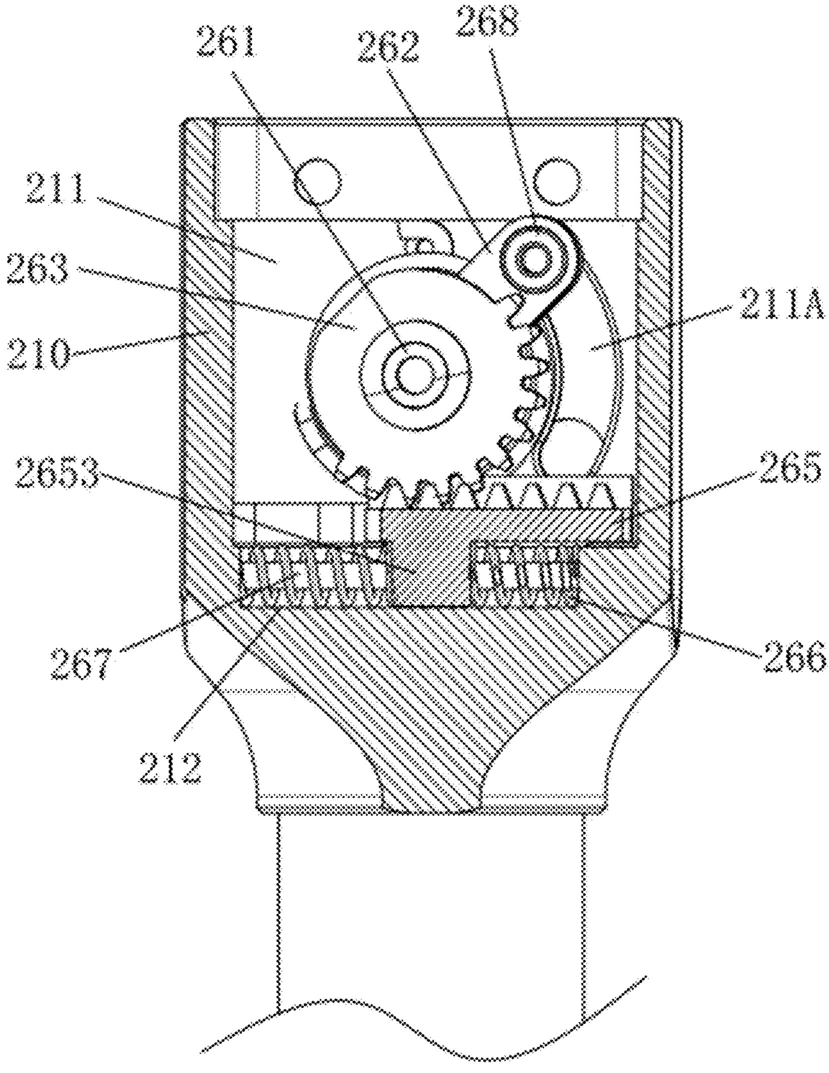
FIG. 6 shows the internal structure of the gear transmission assembly in the leg head end seat according to an embodiment of the present invention.

As illustrated in FIGS. 4, 5, and 6, the gear transmission assembly further comprises a right-angle double-sided rack 265, which is connected between the first gear 263 and the second gear 264. This rack comprises two perpendicular tooth surfaces: the first tooth surface 2651 engages with the first gear 263, while the second tooth surface 2652 engages with the second gear 264. Notably, the pitch of the first tooth surface 2651 is greater than that of the second tooth surface 2652. By utilizing this pitch difference, the right-angle double-sided rack 265 achieves a higher transmission ratio. Consequently, when the locking force of the locking assembly remains constant, a relatively smaller force is required to operate the handle 300 to unlock the mechanism, thereby enhancing operational efficiency.

As shown in FIGS. 4, 5, and 6, the base of the leg head seat 210 features a linear guide slot 212, with its orientation parallel to the longitudinal axis of the first rack 2651. The right-angle double-sided rack 265 incorporates a rack slider 2653 that slides along the linear guide slot 212 in the same direction. A guide rod 267, fixed to the leg head seat 210, is installed within the linear guide slot 212, with its axial direction parallel to the first rack 2651. The rack slider 2653 is mounted around the guide rod 267 and slides along its periphery.

As shown in FIGS. 4, 5, and 6, the linear slide groove 212 comprises a reset spring 266. When the swing arm 262 is rotated by the traction line 410, the reset spring 266 is compressed by the rack slider 2653, storing elastic potential energy. A torsion spring 269 is mounted around the outer circumference of the rotating shaft 261, positioned between the swing arm 262 and the side mounting seat 211. One end of the torsion spring 269 connects to the side mounting seat 211, while the other end connects to the swing arm 262. When the swing arm 262 is rotated by the traction line 410, the torsion spring 269 twists and stores elastic potential energy. When the operating handle 300 is turned to the unlocked position, the applied traction force on the traction line 410 disappears, releasing both the torsion spring 269 and the reset spring 266. This instantaneously drives the internal transmission shaft 251 and the external transmission shaft 252 to rotate, thereby immediately engaging the first locking assembly to secure the middle leg tube 222 and the front leg tube 221. Simultaneously, the second locking assembly engages the rear leg tube 223 and the middle leg tube 222, ensuring no noticeable delay in the locking process of the support leg 200.

As shown in FIGS. 4, 5, and 6, the side mounting base 211 features an arc-shaped limit groove 211A on one side, with its center aligned with the rotation axis 261. The end of the swing arm 262 connected to the traction line 410 is fixed with a guide shaft 268, whose axis is parallel to the rotation axis 261. One end of the guide shaft 268 extends into the arc-shaped limit groove 211A. The interaction between the guide shaft 268 and the arc-shaped limit groove 211A enables the swing arm 262 to swing within a predetermined direction and angle range.

Figure 7:
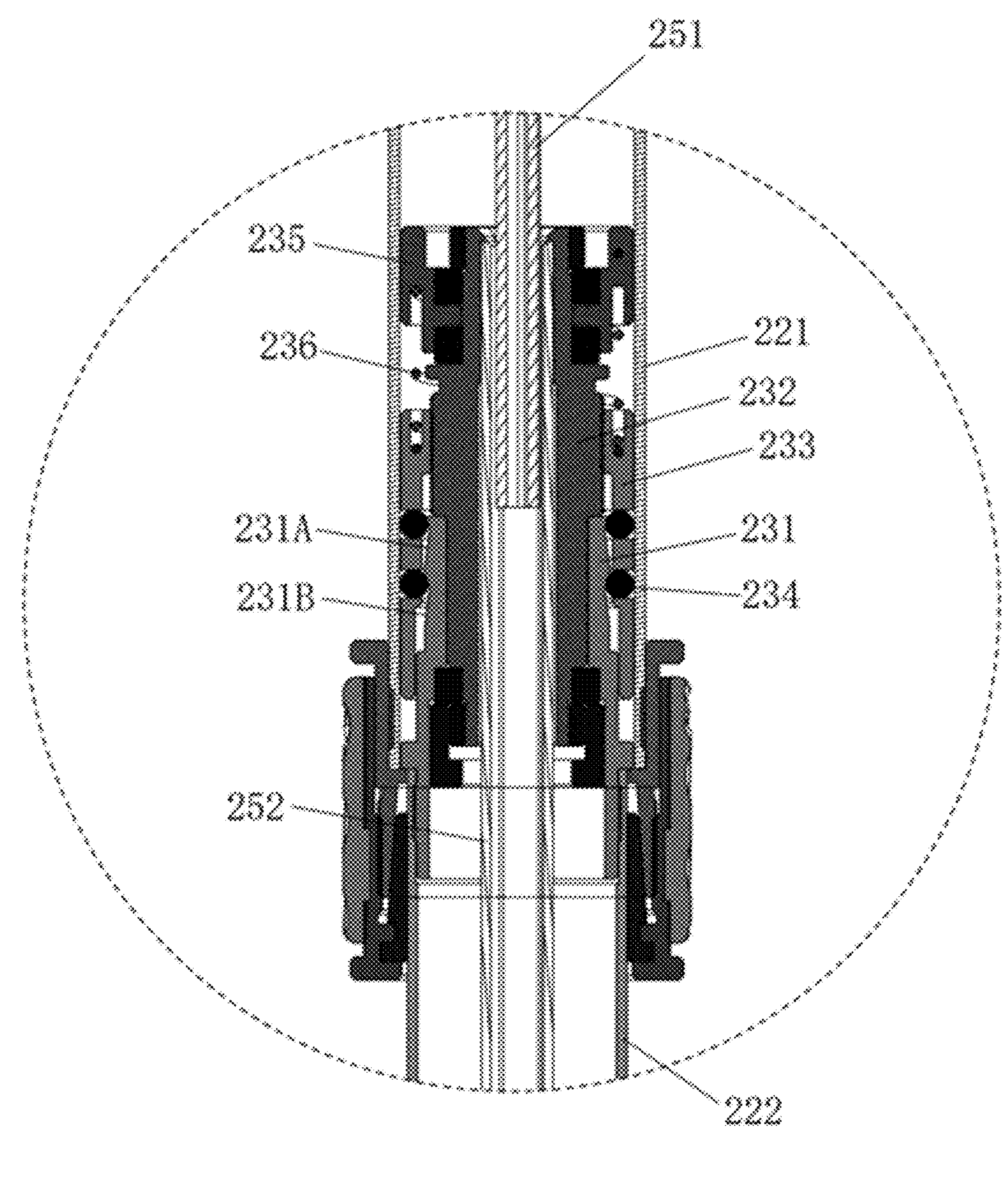
FIG. 7 is an enlarged view of the B location in FIG. 3.

As shown in FIG. 7, the first locking assembly comprises a first fixed sleeve 231, a first rotating sleeve 232, and a first sliding sleeve 233. The first fixed sleeve 231 is securely attached to the interior of the middle leg tube 222, with one end extending into the front leg tube 221. Its outer wall features a first inclined conical surface. The first rotating sleeve 232 is coaxially aligned with the first fixed sleeve 231, maintaining relative axial fixation and circumferential rotation. It is mounted around the outer circumference of the external drive shaft 252, ensuring circumferential stability. The first sliding sleeve 233 is positioned inside the front leg tube 221, partially encircling the outer periphery of the first fixed sleeve 231. It is threadedly connected to the outer circumference of the first rotating sleeve 232. When the external drive shaft 252 rotates the first rotating sleeve 232, one end of the first sliding sleeve 233 slides into the gap between the first fixed sleeve 231 and the front leg tube 221, pressing against the first inclined conical surface of the first fixed sleeve to lock the front and middle leg tubes. Alternatively, the sliding end may disengage from the gap, releasing the conical surface to unlock the connection.

As shown in FIG. 7, the first sliding sleeve 233 houses the first ball 234, which partially protrudes from its inner wall and contacts the first inclined conical surface. Specifically, this surface comprises a primary inclined conical surface 231A and a secondary inclined conical surface 231B, arranged axially along the first fixed sleeve 231. Two balls 234 are positioned to engage with the primary and secondary surfaces respectively. This dual-conical surface design with ball engagement significantly enhances locking reliability.

As shown in FIG. 7, the first locking assembly further comprises a first limit sleeve 235, which is fixedly mounted around the outer periphery of the first rotating sleeve 232 and positioned inside the front leg tube 221. The first limit sleeve 235 is located at the end of the first sliding sleeve 233 adjacent to the support leg head end seat 210. A first elastic member 236 is disposed between the first limit sleeve 235 and the first sliding sleeve 233, providing a biasing force to the first sliding sleeve 233 for improved reset performance.

As shown in FIG. 7, the first locking assembly comprises a first fixed sleeve 231, a first rotating sleeve 232, and a first sliding sleeve 233. The first fixed sleeve 231 is securely attached to the interior of the middle leg tube 222, with one end extending into the front leg tube 221. Its outer wall features a first inclined conical surface. The first rotating sleeve 232 is coaxially aligned with the first fixed sleeve 231, maintaining relative axial fixation and circumferential rotation. It is mounted around the outer circumference of the external drive shaft 252, ensuring circumferential stability. The first sliding sleeve 233 is positioned inside the front leg tube 221, partially encircling the outer periphery of the first fixed sleeve 231. It is threadedly connected to the outer circumference of the first rotating sleeve 232. When the external drive shaft 252 rotates the first rotating sleeve 232, one end of the first sliding sleeve 233 slides into the gap between the first fixed sleeve 231 and the front leg tube 221, pressing against the first inclined conical surface of the first fixed sleeve to lock the front and middle leg tubes. Conversely, sliding the end of the first sliding sleeve 233 out of the gap releases the pressure, thereby unlocking the front and middle leg tubes.

Figure 8:
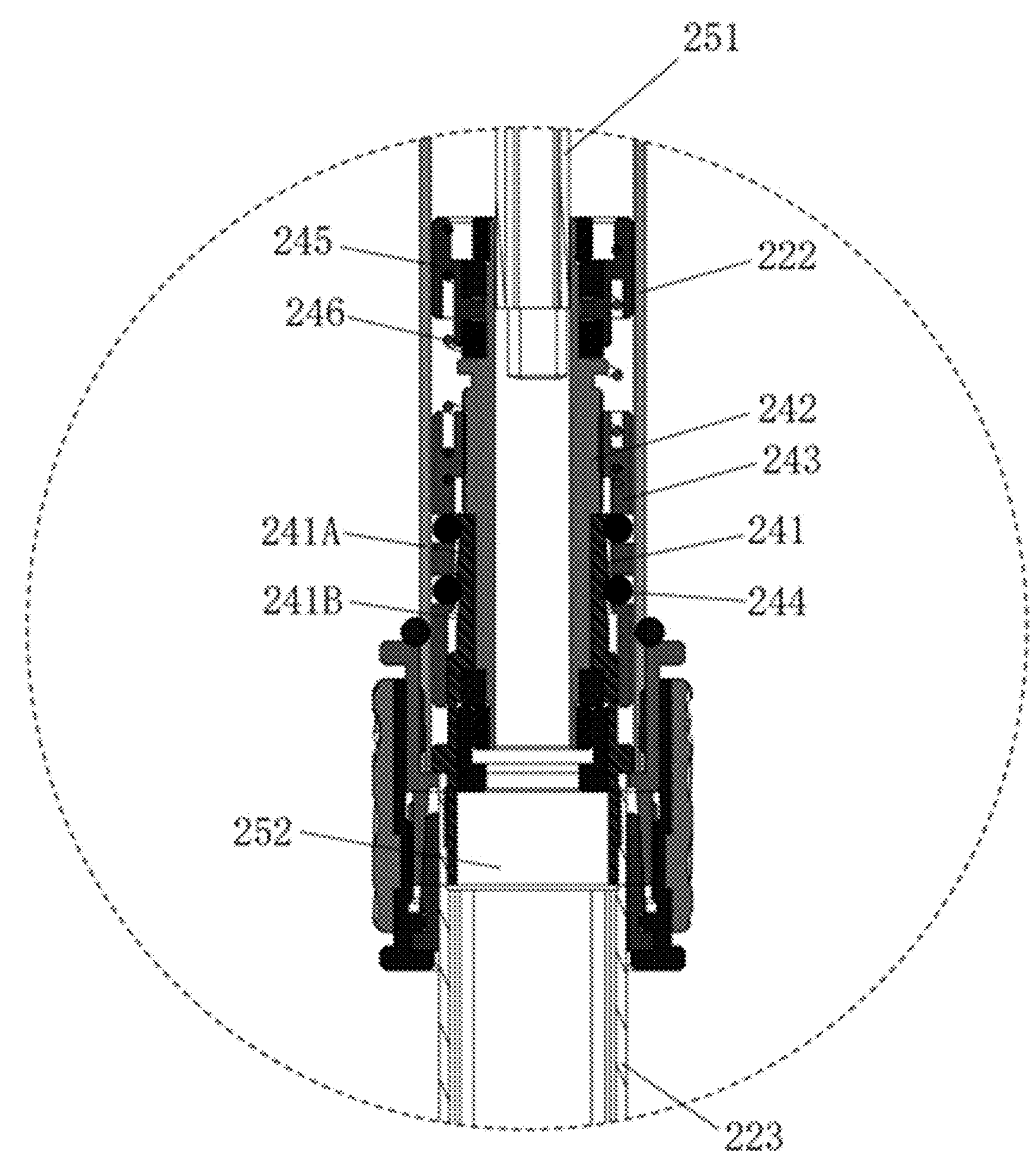
FIG. 8 is an enlarged view of the C location in FIG. 3.

As shown in FIG. 8, the second locking assembly comprises a second fixed sleeve 241, a second rotating sleeve 242, and a second sliding sleeve 243. The second fixed sleeve 241 is securely attached to the interior of the rear leg tube 223, with one end extending into the middle leg tube 222. Its outer wall features a second inclined conical surface. The second rotating sleeve 242 is coaxially aligned with the second fixed sleeve 241, maintaining relative axial fixation and circumferential rotation. It is mounted around the outer circumference of the external drive shaft 252, ensuring circumferential stability. The second sliding sleeve 243 is positioned inside the middle leg tube 222, partially encircling the outer periphery of the second fixed sleeve 241. It is threadedly connected to the outer circumference of the second rotating sleeve 242. When the external drive shaft 252 rotates the second rotating sleeve 242, one end of the second sliding sleeve 243 slides into the gap between the second fixed sleeve 241 and the middle leg tube 222, pressing against the second inclined conical surface of the second fixed sleeve 241 to lock the middle leg tube 222 and rear leg tube 223. Alternatively, the sliding end may disengage from the gap between the second fixed sleeve 241 and the front leg tube 221, releasing the conical surface to unlock the connection.

As shown in FIG. 8, the second sliding sleeve 243 houses the second ball 244, which partially protrudes from its inner wall and contacts the second inclined conical surface. Specifically, this surface comprises a primary inclined conical surface 241A and a secondary inclined conical surface 241B, arranged axially along the second fixed sleeve 241. Two balls 244 are positioned to engage with the primary and secondary surfaces respectively. This dual-conical surface design with ball engagement significantly enhances locking reliability.

As shown in FIG. 8, the second locking assembly further comprises a second limit sleeve 245, which is fixedly mounted around the outer periphery of the second rotating sleeve 242 and positioned inside the front leg tube 221. The second limit sleeve 245 is located at the end of the second sliding sleeve 243 adjacent to the support leg head end seat 210. A second elastic member 246 is disposed between the second limit sleeve 245 and the second sliding sleeve 243, providing biasing force to the second sliding sleeve 243 for improved reset performance.

Figure 9:
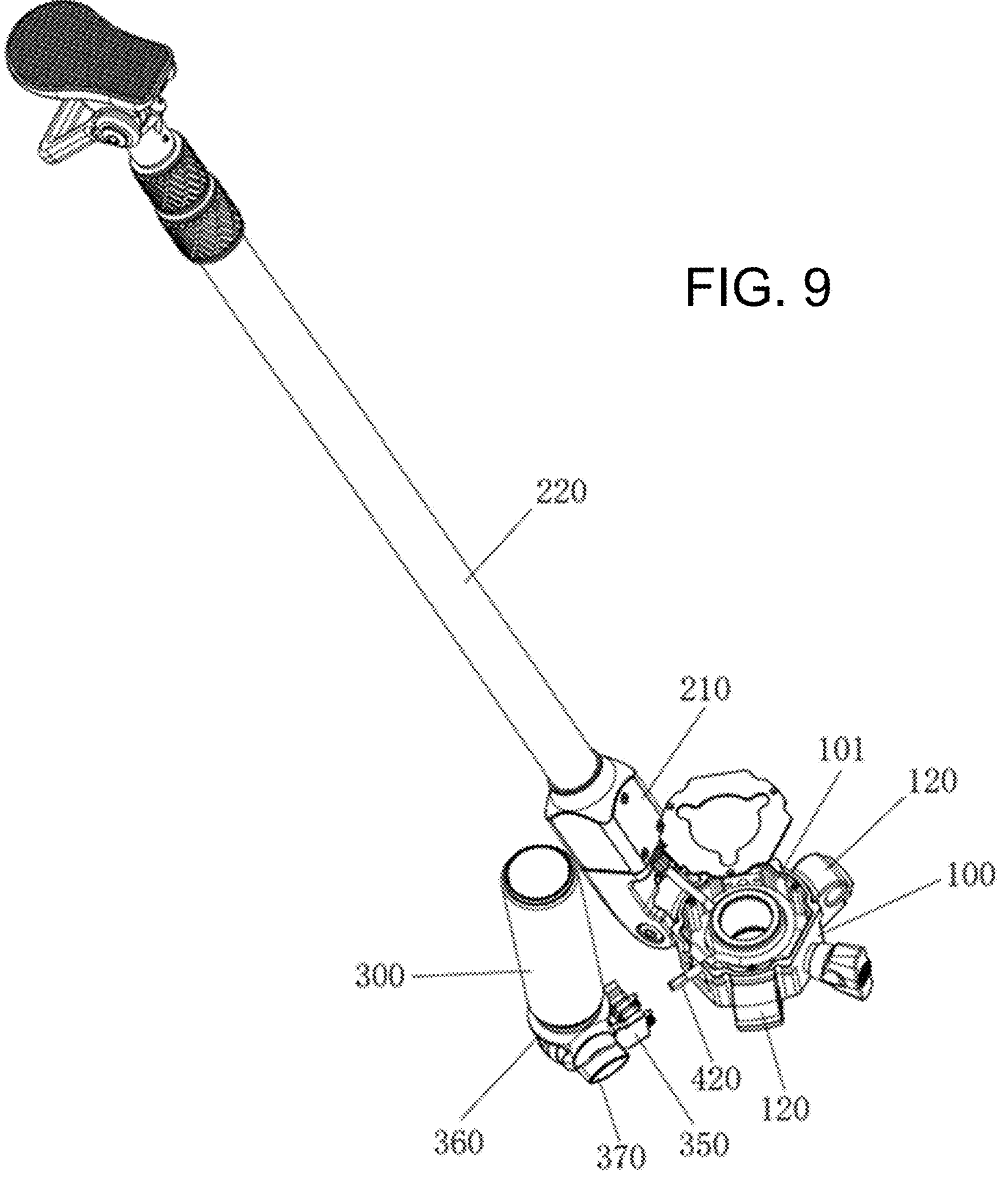
FIG. 9 shows the connection diagram of the installation platform, support legs, operating handle, and protective sleeve in the embodiments of the present invention.
Figure 10:
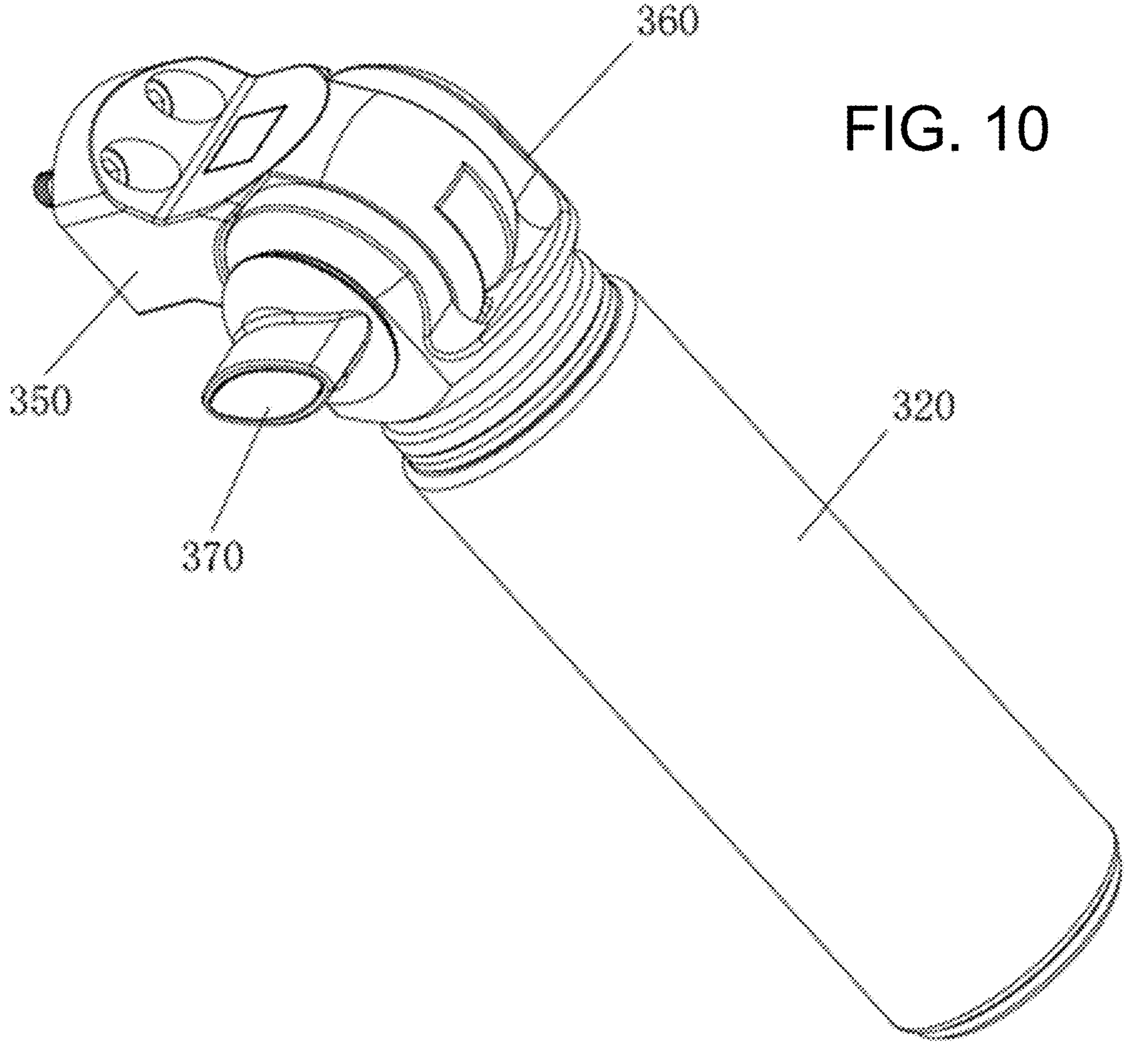
FIG. 10 shows a three-dimensional schematic of the handle in the embodiments of the present invention.
Figure 11:
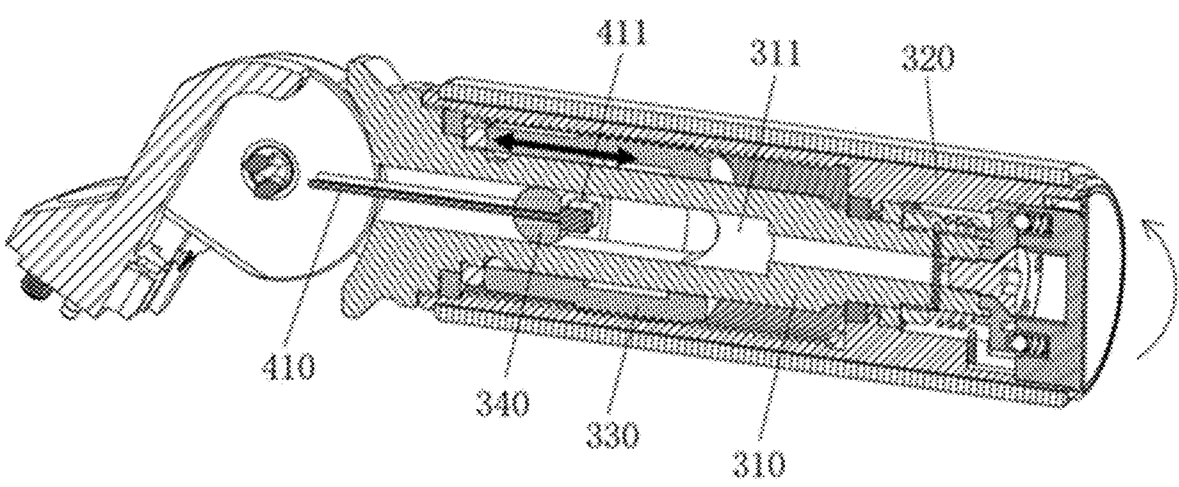
FIG. 11 shows a cross-sectional view of the operating handle in the embodiments of the present invention.
Figure 12:
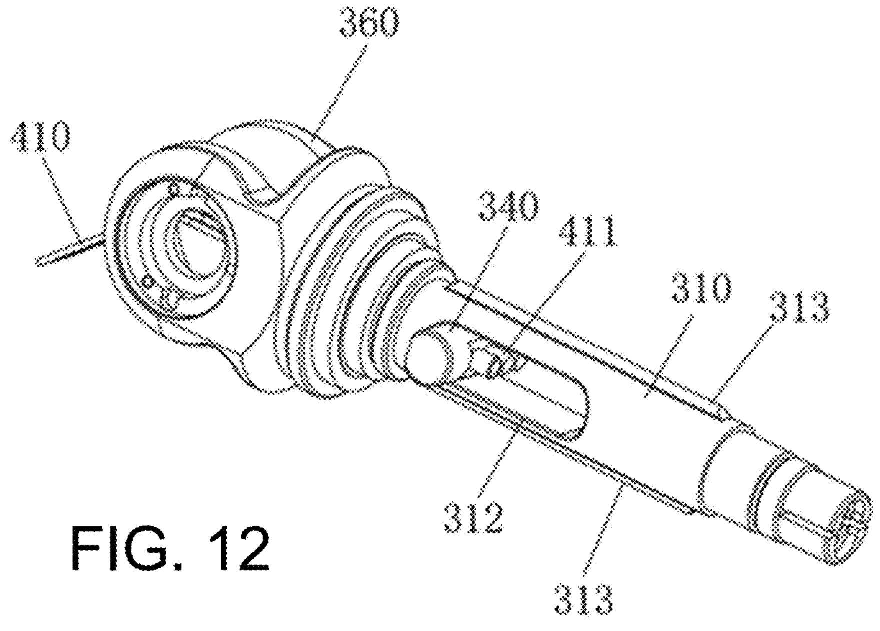
FIG. 12 shows the connection relationship between the handle shaft and the fixing pin in the embodiment of the present invention.

As shown in FIGS. 4, 5, and 9, the three traction lines 410 extend from the leg head end seat 210, each fitted with a protective sleeve 420. These traction lines 410 are routed through the internal channels of their respective protective sleeves 420. The traction lines 410 are typically made of steel wire material similar to brake cables, while the protective sleeves 420 reduce friction during movement within their internal channels, thereby enhancing the response speed of the traction lines under tension. One end of the protective sleeves 420 connected to the leg head end seat 210 features a pipe fitting. Inside the installation platform 100, a circumferential annular cavity 101 surrounds the connection head 110. Three protective sleeves 420 extend from the bottom opening of the installation platform 100 into the annular cavity 101, routing around it before extending to the control handle. The ends of the protective sleeves 420 opposite the leg head end seat 210 pass through openings in the side wall of the installation platform 100 and enter the interior of the control handle 300.

As shown in FIGS. 1 and 9, the installation platform 100 is fixedly connected to three support leg connection seats 120 around its periphery, with three support legs 200 hinged to these connection seats respectively.

As shown in FIGS. 1 and 9-12, the operating handle 300 comprises a handle shaft 310, a handle rotating sleeve 320, a handle sliding sleeve 330, a fixing pin 340, a handle hinge joint 350, a handle connection base 360, and a handle locking knob 370. The handle hinge joint 350 is fixed to the outer periphery of the mounting platform 100. Its hollow interior accommodates three traction lines 410 extending from three protective sleeves 420, which pass through the joint's cavity before reaching the movable cavity 311 of the handle shaft 310. The handle connection base 360, pivotally mounted on the handle shaft 310 near the hinge joint 350, rotates around a hinge shaft linked to the handle locking knob 370. This knob allows adjustment of the handle 300's operational angle.

As shown in FIGS. 1 and 9-12, one end of the handle shaft 310 is fixedly connected to the handle connection base 360, with a movable cavity 311 internally arranged. The handle shaft 310 features a radial through-sliding groove 312 extending along its axial direction. The handle rotating sleeve 320 is mounted around the shaft, maintaining axial fixation while allowing circumferential rotation relative to the shaft. The handle sliding sleeve 330 slides axially along the shaft's outer periphery and is threadedly connected to the inner wall of the rotating sleeve. A fixed pin 340 is attached to the sliding sleeve and slidably engages with the through-sliding groove 312. Three traction lines 410 are secured to the fixed pin via the movable cavity 311, each equipped with three threading holes. These lines connect to a traction line limiting head with a larger diameter than the holes, which contacts the fixed pin for positioning. The handle shaft and rotating sleeve form the stationary components of the operating handle 300, while the sliding sleeve and fixed pin constitute its movable parts.

As shown in FIGS. 9-12, the outer wall of handle shaft 310 features a pair of protruding limit ribs 313 that extend axially along the shaft. The inner wall of handle sliding sleeve 330 comprises a corresponding limit groove that slidably engages with the ribs.

In summary, the one-touch operation support frame disclosed in embodiments of the invention features a traction line 410 connected to the gear transmission assembly of support legs 200. When pulled, the traction line drives the gear transmission assembly and transmission shaft assembly to lock or release the multi-section leg tube assembly 220. The other ends of the traction lines 410, each connected to one of the three support legs 200, are all linked to the operating handle 300. By operating the handle 300, users may simultaneously apply traction force to at least three traction lines 410, enabling synchronized locking/unlocking of all three support legs. This design allows one-touch release and fixation, simplifying operation and significantly improving the telescopic adjustment speed of the support legs. Compared to existing one-touch operation frames with electrically controlled handles 300, this design eliminates the need for charging or additional equipment like chargers and power banks, enhancing portability. Unlike hydraulic-driven handle systems, it achieves instant locking without delay. The gear transmission assembly utilizes a larger tooth pitch between the first rack 2651 and second rack 2652, increasing the transmission ratio. Under constant locking force conditions, the operating handle 300 requires only minimal force to unlock, achieving effortless operation. When the operating handle 300 is rotated to the unlocked position, the torsion spring 269 and reset spring 266 are released, instantly driving the transmission shaft assembly to rotate. This, in turn, immediately activates the leg tube locking mechanism to secure the multi-section leg tubes, eliminating any noticeable delay in the locking process.

Clearly, the aforementioned embodiments are provided solely as illustrative examples for clarity, without constituting limitations on the implementation methods. Skilled professionals in the relevant field may further develop variations or modifications based on these descriptions. It is neither necessary nor feasible to exhaustively list all possible implementations. Any apparent variations or adaptations derived from this context remain within the scope of protection of embodiments of the invention.

What is claimed is:

1. A one-touch operation support stand, comprising:

an installation platform (100), at least three support legs (200) connected to one end of the installation platform (100), and an operating handle (300) attached to the installation platform (100);

wherein each support leg (200) comprises:

a leg head end seat (210) is connected to the mounting platform (100) at one end;

a leg tube assembly (220) comprises multiple axially extendable leg tubes arranged sequentially from the outermost to the innermost;

an outermost leg tube is fixedly connected to the leg head end seat (210);

a leg tube locking assembly, housed within the support leg (200), is configured to locking or unlocking of the multi-section leg tube;

a drive shaft assembly, mounted on the support leg (200) and rotatable about its own axis, is connected to the leg tube locking assembly for transmission;

a gear transmission assembly mounted on the leg head end seat (210), with its power output end connected to the transmission shaft assembly for power transmission;

traction lines (410) connected to the power input end of the gear transmission assembly for driving the leg tube locking assembly to either lock or release through the gear transmission and drive shaft assemblies; and at least three traction lines (410) extending from the leg head end seat (210) and connect to the operating handle (300) for simultaneously applying traction force to all three lines.

2. The one-touch operation support stand of claim 1, wherein the gear transmission assembly is installed inside the leg head end seat (210), and the gear transmission assembly comprises:

a rotating shaft (261) mounted on the leg head end seat (210) and is rotatable about its own axis;

an arm (262) fixedly connected to the rotating shaft (261) at one end and to the traction line (410) at the other end;

a first gear (263) is fixedly mounted on the rotating shaft (261) and rotates synchronously with the swing arm (262);

a second gear (264) is fixedly connected coaxially to the drive shaft assembly and attached to the leg head end seat (210), and is transmissionally connected to the first gear (263); and in response to the traction line (410) being pulled, the traction line (410) is configured to drive the swing arm (262), the rotating shaft (261), and the first gear (263) to rotate axially around the rotating shaft (261), wherein the first gear (263) drives the second gear (264) and the transmission shaft assembly to rotate axially around its own axis.

3. The one-touch operation support stand of claim 2, wherein the gear transmission assembly further comprises a right-angle double-sided rack (265) connected between the first gear (263) and the second gear (264); and the right-angle double-sided rack (265) includes a first rack (2651) and a second rack (2652) with mutually perpendicular tooth surfaces, where the first rack (2651) engages with the first gear (263) and the second rack (2652) engages with the second gear (264).

4. The one-touch operation support stand of claim 3, wherein the pitch of the first rack (2651) is greater than that of the second rack (2652).

5. The one-touch operation support stand of claim 3, wherein the leg head end seat (210) comprises a linear sliding groove (212) at its base, the guiding direction of which is parallel to the longitudinal direction of the first rack (2651); and wherein a right-angle double-sided rack (265) comprises a rack slider (2653) slidably connected to the linear sliding groove (212) along its guiding direction.

6. The one-touch operation support stand of claim 5, wherein the linear sliding groove (212) comprises a reset spring (266), wherein in response to a swing arm (262) rotating under traction line (410), the reset spring (266) is configured to be compressed by the rack slider (2653) and stores elastic potential energy.

7. The one-touch operation support stand of claim 5, wherein the linear sliding groove (212) houses a guide rod (267) fixed to the leg head end seat (210), with the guide rod's axial direction parallel to the first rack (2651)'s lengthwise direction, wherein the rack slider (2653) is sleeved around the guide rod's outer periphery and slidably connected thereto.

8. The one-touch operation support stand of claim 2, wherein the inner side wall of the leg head end seat (210) is fixedly connected to a side mounting seat (211), with one end of the rotating shaft (261) attached to the side mounting seat (211), wherein the side mounting seat (211) comprises an arc-shaped limiting groove (211A) whose center lies on the axis of the rotating shaft (261), wherein the swing arm (262) is fixedly connected to the traction line (410) at one end, wherein the swing arm (262) is equipped with a guide shaft (268) whose axis direction is parallel to that of the rotating shaft (261), and one end of the guide shaft (268) extends into the arc-shaped limiting groove (211A).

9. The one-touch operation support stand of claim 8, wherein the gear transmission assembly further comprises a torsion spring (269) sleeved around the outer periphery of the rotating shaft (261), wherein the torsion spring (269) is positioned between the swing arm (262) and the side mounting seat (211), with one end connected to the side mounting seat (211) and the other end to the swing arm (262), wherein, in response to the swing arm (262) being rotated by the traction line (410), the torsion spring (269) twists and stores elastic potential energy.

10. The one-touch operation support stand of claim 1, wherein the mounting platform (100) comprises a centrally positioned connector (110) for mounting photographic equipment, and an annular cavity (101) circumferentially arranged around the connector (110) is formed inside the mounting platform (100), wherein multiple protective sleeves (420) are arranged within the annular cavity (101), with one end of each sleeve extending through the mounting platform (100) to connect to the operating handle (300), while the other end extends through the mounting platform (100) to connect to respective leg head seats (210), and wherein the traction lines (410) are routed through the internal channels of the protective sleeves (420).

11. The one-touch operation support stand of claim 1, wherein the leg tube assembly (220) comprises a front leg tube (221), a middle leg tube (222), and a rear leg tube (223) arranged sequentially from the outermost to the innermost and axially extendable, with the front, middle, and rear leg tubes being circumferentially fixed relative to each other, wherein the leg tube locking assembly comprises a first locking assembly installed between the front leg tube (221) and the middle leg tube (222), and a second locking assembly installed between the middle leg tube (222) and the rear leg tube (223), wherein the drive shaft assembly comprises an inner drive shaft (251) fixed to the power output end of the gear transmission assembly, and an outer drive shaft (252) mounted around the inner shaft, maintaining circumferential fixation while allowing axial sliding, wherein the outer drive shaft (252) is operatively connected to a first locking mechanism to releasably prevent movement of the middle leg tube (222) relative to the front leg tube (221), and to a second locking mechanism to releasably prevent movement of the rear leg tube (223) relative to the middle leg tube (222).

12. The one-touch operation support stand of claim 11, wherein the first locking assembly comprises:

a first fixing sleeve (231) fixedly connected to the middle leg tube (222) with one end extending into the front leg tube (221), wherein an outer wall thereof features a first inclined conical surface;

a first rotating sleeve (232) coaxially aligned with the first fixed sleeve (231), maintaining axial fixation while allowing circumferential rotation relative to it, wherein the first rotating sleeve (232) is mounted around the outer circumference of the outer drive shaft (252) and fixed circumferentially to it;

a first sliding sleeve (233) is positioned inside the front leg tube (221) and partially encases the outer circumference of the first fixed sleeve (231), while being threadedly connected to the outer circumference of the first rotating sleeve (232);

in response to the external drive shaft (252) rotating about the first rotating sleeve (232) circumferentially, one end of the first sliding sleeve (233) slides into the gap between the first fixed sleeve (231) and the front leg tube (221), pressing against the first inclined conical surface of the first fixed sleeve (231) to lock the front leg tube (221) and the middle leg tube (222), or the first sliding sleeve (233) slides out of the gap between the first fixed sleeve (231) and the front leg tube (221), releasing the first inclined conical surface of the first fixed sleeve (231) to unlock the front leg tube (221) and the middle leg tube (222).

13. The one-touch operation support stand of claim 12, wherein the first sliding sleeve (233) is internally fitted with a first ball (234), part of which protrudes from the inner wall surface of the first sliding sleeve (233) and abuts against the first inclined conical surface.

14. The one-touch operation support stand of claim 13, wherein the first inclined conical surface comprises a primary first inclined conical surface (231A) and a secondary first inclined conical surface (231B) arranged sequentially along the axial direction of the first fixed sleeve (231); the first ball (234) comprises two units, each contacting the respective primary and secondary first inclined conical surfaces (231A and 231B).

15. The one-touch operation support stand of claim 12, wherein the first locking assembly further comprises a first limit sleeve (235) fixedly mounted on the outer periphery of the first rotating sleeve (232) and disposed inside the front leg tube (221), wherein the first limit sleeve (235) is positioned at the end of the first sliding sleeve (233) adjacent to the support leg head end seat (210), with a first elastic member (236) interposed between the first limit sleeve (235) and the first sliding sleeve (233).

16. The one-touch operation support stand of claim 1, wherein the operation handle (300) comprises an operating section attached to the mounting platform (100) and a movable section driven by the operating section, with at least three traction lines (410) extending from the leg head end seat (210) and all connected to the movable section.

17. The one-touch operation support stand of claim 16, wherein the operation part comprises:

a handle shaft (310) attached to the mounting platform (100) at one end comprising a movable cavity (311) internally and features a radial through-sliding groove (312) that extends along its axial direction;

a handle rotating sleeve (320) mounted around the handle shaft (310) for maintaining axial fixation while allowing circumferential rotation relative to the shaft;

wherein operation part comprises:

a handle sliding sleeve (330) slidably mounted along the axial direction of the handle shaft (310) and threadedly engages with the inner wall of the handle rotating sleeve (320);

a fixed pin (340) is securely attached to the handle sliding sleeve (330) and slidably connected along the axial direction of the handle shaft (310) within the through sliding groove (312), wherein multiple traction lines (410) are fixedly connected to the fixed pin (340) via the inner cavity of the handle shaft (310).

18. The one-touch operation support stand of claim 17, wherein the fixing pin (340) comprises multiple threading holes for the traction line (410) to pass through, and the traction line (410) is connected to a limiting head end whose outer diameter exceeds the threading holes and abuts against the fixing pin (340) for positioning.

19. The one-touch operation support stand of claim 18, wherein the handle shaft (310) comprises an outwardly protruding limit rib (313) on its outer wall, the limit rib (313) extending axially along the handle shaft (310), and the handle sliding sleeve (330) comprises a limit groove on its inner wall that slidably engages with the limit rib (313).

20. The one-touch operation support stand of claim 18, wherein the mounting platform (100) is fixedly connected to a handle hinge head (350) at its outer periphery, wherein the operating handle (300) comprises a handle connection seat (360) fixedly attached to the handle shaft (310) near the handle hinge head (350), with the handle connection seat (360) pivotally connected to the handle hinge head (350) via a hinge shaft; and wherein the hinge shaft is equipped with a handle locking knob (370) for securing both the handle connection seat (360) and the handle hinge head (350).

* * * * *